United States Patent [19]
Paton et al.

[11] 3,912,343
[45] Oct. 14, 1975

[54] VEHICLE SIDE BEARING AND FRICTION DAMPER

[76] Inventors: Hamilton Neil King Paton, 2521 W. Montlake Place E., Seattle, Wash. 98112; John B. Skilling, 3000 Webster Pt. Road NE., Seattle, Wash. 98105; Frank F. Smith, 914 N. 79th, Seattle, Wash. 98103

[22] Filed: Apr. 3, 1974

[21] Appl. No.: 457,427

[52] U.S. Cl. .............................. 308/138; 105/182 R
[51] Int. Cl.² ............................................ B61F 5/14
[58] Field of Search ...... 305/17; 308/137, 138, 221, 308/225; 105/182 R, 138

[56] References Cited
UNITED STATES PATENTS
3,570,409  5/1971  Oelkers ........................... 105/182 R
3,709,151  1/1973  Cook ................................... 308/138

*Primary Examiner*—Philip Goodman
*Attorney, Agent, or Firm*—Dowrey & Cross

[57] ABSTRACT

A lower bearing member is fixed to a wheeled truck, an upper bearing member is fixed to the vehicle body, a movable central bearing member is positioned between the upper and lower bearing members, the lower side of the movable central bearing member has a concave low friction surface which engages a convex smooth surface on the lower bearing member and the upper side of the movable central bearing member has a planar low friction surface which engages a smooth planar under surface of the vehicle body so that the vehicle body is mounted for transmitting vertical loads directly and incompressibly to the vehicle truck and can move in arcuate directions about a centroid relative to the vehicle truck while friction damping in proportion to load the dynamically induced oscillatory motion between the carried member and the wheeled member. In a first modified form of the side bearing, ball bearings are mounted between the concave-convex surfaces. In a second and preferred form, the concave surface is interrupted to form an annular land, the lower arcuate surface of which mates with the convex surface of the lower bearing member.

17 Claims, 8 Drawing Figures

VEHICLE SIDE BEARING AND FRICTION DAMPER

BACKGROUND OF THE INVENTION

1. Field of the Invention

This invention pertains to side bearings for transmitting vertical loads and allowing friction controlled omni-directional movement between a vehicle body and a vehicle truck. The invention is illustrated and described herein in the environment of a rail car comprised of a body and two wheeled trucks which respectively support the ends of the body; however, it will be recognized that the invention may be used in other environments and applications wherein it is desired to provide load transmission and/or friction controlled or damped omni-directional movement between a carried member and a carrying member.

2. Description of the Prior Art

Various types of side bearings have been provided heretofore for supporting a vehicle at two points on a vehicle truck. One bearing in particular uses roller bearings. while roller side bearings are in some instances functionally adequate, they are expensive to manufacture and costly to maintain since they consist of machined elements which can be damaged due to high dynamic loading during service conditions.

Other types of side bearings have relied on some supplemental form of compressible cushioning for compliance to accommodate the lateral, longitudinal and combinations of simultaneous lateral and longitudinal movement, or static body twist between the vehicle body and the truck. Such supplemental cushioning arrangements weaken the structural viability of the entire bearing system and increase the cost of construction and maintenance of the bearing. Also, in order to carry the load required they are too stiff to comply with body twist on dynamic body wracking.

A non-centroidally movable sprung side bearing is shown, for example, in U.S. Pat. No. 3,570,409 in which the main suspension springs directly support and form part of the side bearing relative to the side frame.

SUMMARY OF THE INVENTION

It is an object of this invention to provide a low friction side bearing for a vehicle truck that allows compliant positioning and omni-directional, arcuate movement between the car body and truck while carrying vertical loads therebetween.

It is another object of this invenvion to provide a low cost easily maintained side bearing for a railway car truck and car body.

It is another object of this invention to provide a side bearing for a rail car truck which allows for omni-directional movement while providing inherent damping.

These objects are obtained by providing upper, middle and lower bearing members. Mating convex, concave low friction surfaces are provided between two adjacent bearing members with a central bearing member floating between the upper and lower bearing members. The other side of the central bearing member is provided with a planar low friction surface which abuts against a planar smooth surface on one of the other bearing members. In this manner, the central member floats on the lower bearing member allowing the car truck to move in an arcuate path omni-directionally, and also about the centroid of the convex surface.

The floating action of the central member provides for transmission of vertical loads regardless of the lateral, longitudinal or combination of lateral and longitudinal movements due to built-in, or service developed body twist or the dynamic forces acting on the car truck and car body such as are present due to track irregularities and normal running oscillations of the rail car. The floating member allows the car body to move rotationally relative to the truck while transmitting vertical loads. The transmission of the load is directly vertically incompressibly made into the side frame without having to go through a supplemental cushioning arrangement. By using a selective range of coefficients of friction, friction damping for the car body and car truck system may be obtained to decrease or eliminate truck shimmy or high speed hunting. A proper selection of the anti-friction materials also provide a very low stick-slip factor which means that the coefficient of friction will remain virtually constant through any range of oscillatory movement experienced.

Figure 1:
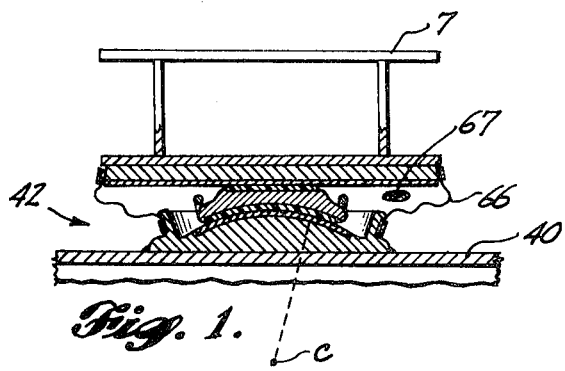
FIG. 1 is a longitudinal section of one of the side bearings embodying the principles of the invention.

In the example of FIGS. 1–5, a bolster 7, upon which one end of the rail car body (not shown) is mounted, extends between and is supported at its ends by two bearings 42 of this invention directly upon a wheeled car truck which is or may be of conventional design. The illustrated rail car truck includes two parallel side frames 40 (one side frame not shown) and a transverse torsional member 49 (FIG. 2) therebetween. As applied to a rail car comprised of a car body supported at its ends by two such trucks, the bearings of this invention provide omni-directional, low friction, high strength, vertically imcompressable side bearing support for the car body.

The side bearing of FIGS. 1–5 comprises a lower bearing member or casting 52 which is fixed to the top of the side frame 40, a floating central bearing member or casting 58, and an upper bearing member or plate 61 which is fixed to the underside of the body bolster 7. The central and lower bearing members are maintained in continuous load bearing contact with each other by spring clip means, presently to be described.

Figure 2:
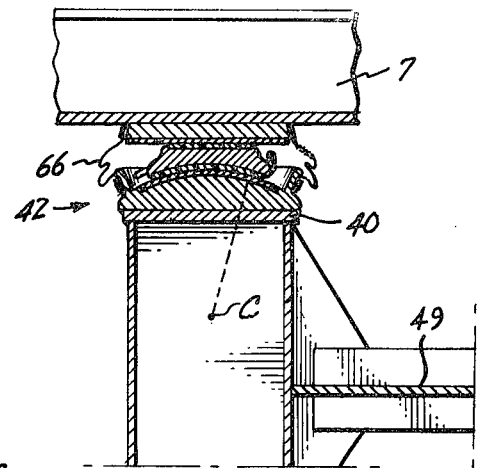
FIG. 2 is a transverse section of a side bearing.
Figure 3:
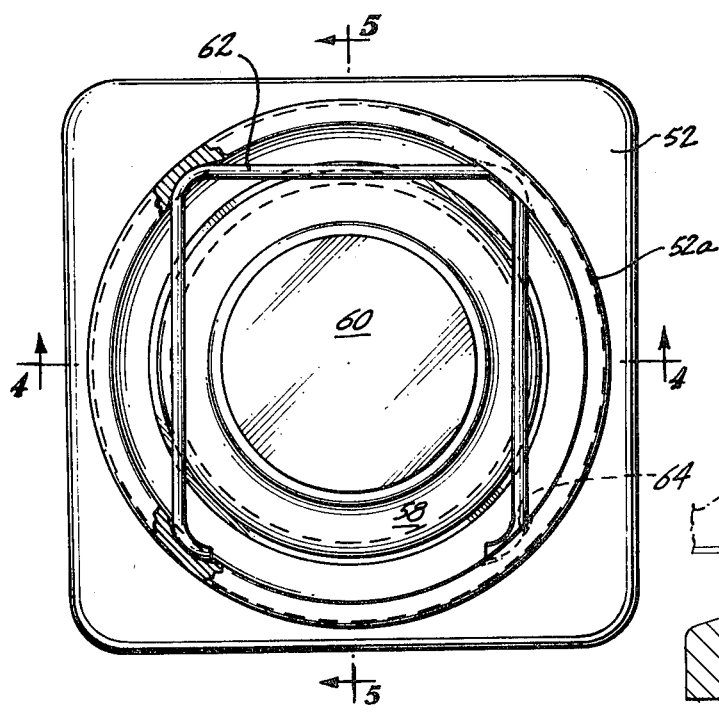
FIG. 3 is a plan of the bearing shown in FIG. 1
Figure 5A:
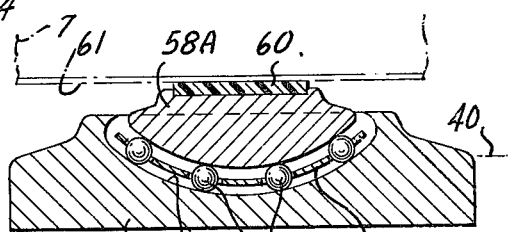
FIG. 5A is a section of a first modified bearing.
Figure 4:
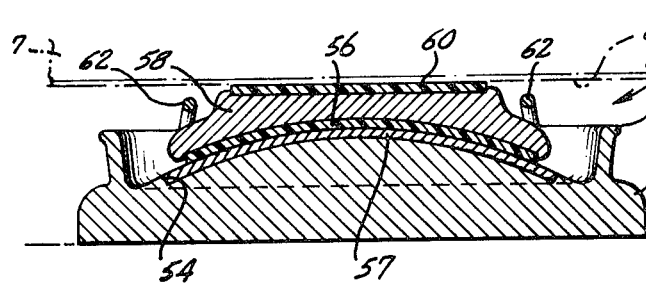
FIG. 4 is an enlarged section taken along lines 4—4 in FIG. 3.
Figure 5B:
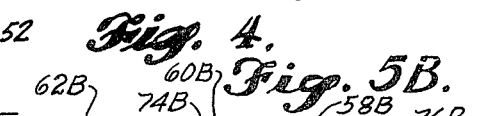
FIG. 5B is a section of a second modified bearing.
Figure 5:
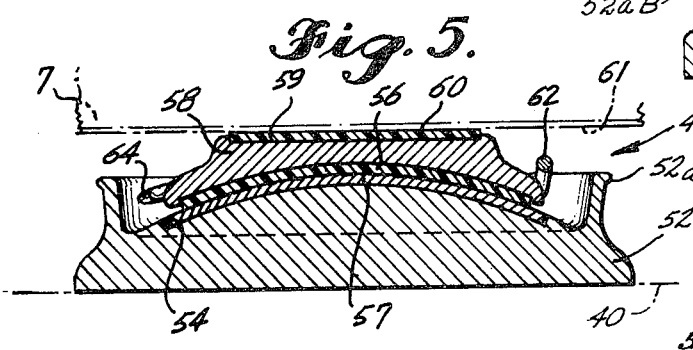
FIG. 5 is an enlarged section taken along lines 5—5 in FIG. 3.

Referring now in particular to FIGS. 3–5, the lower casting 52 includes an upstanding peripheral flange 52a and a domed midsection of generally hemispherical cross sectional configuration. The domed midsection includes a recess 54 (FIG. 5) in which is secured a polished or smooth metal plate 57, also of generally hemispherical cross sectional configuration. The floating central bearing member or casting 58 has a concave lower surface. A concave anti-friction composite disc 56 is fastened to the concave lower surface of the floating central bearing member 58 and bears against and mates with the domed midsection of the lower bearing member 52 as shown. The disc 56 has a concave lower surface of generally hemispherical cross sectional configuration generally similar to that of the lower bearing member domed midsection and of substantially the same radius from common centroid C (FIG. 2). The composite disc 56 is fabricated of low friction material, which preferably has a coefficient of friction from 0.02–0.10 and most preferably about 0.04. The floating casting has an upper surface having a recess 59 in which is fastened a second anti-friction composite disc 60. The disc 60 is flat and bears against the upper bearing member 61 which may be smooth or anti-friction coated. The floating round casting is secured in the casting 52 by a conventional spring clip 62 that is received within recesses 64 in the casting 52. The spring clip 62 prevents the floating casting from coming free of the fixed casting 52 but allows omni-directional sliding movement of the floating casting on the fixed casting 52 about the centroid C(FIG. 2), while simultaneously therewith the upper bearing member 61 can slide omni-directionally in a plane relative to the disc 60. The entire assembly is covered by a neoprene coated nylon boot 66 having a breather vent 67. The boot restricts entry of foreign matter into the vicinity of the friction surfaces.

Because there are frequent lateral as well as longitudinal motions between a truck and car body, it is considered essential that the anti-friction surfaces of the bearing be permitted to move in any rotational direction in order to maintain compliance of the upper floating casting surface with the underside of the car body plate 61 at all times. The side bearings further permit the transmission of all load from the car body to be directly made into the side frames without any cushioning arrangement to weaken the structural viability of the entire system. The selected range of coefficient of friction, which can be varied depending on the type of material used for the antifriction composite discs, also provides important friction damping for the car body truck system which is of great value in terms of decreasing or eliminating truck shimmy or high speed hunting, but cannot be too high or it would unduly restrict truck rotation. The floating bearing member provides compliance for various relative positions between truck and body such that the flat bearing surfaces remain in full contact. This results in generally constant damping dependent on load rather than the relative positions of the truck and body and serves to reduce dynamically induced oscillatory motions therebetween without introducing uncontrollable random forces into the system. As is best shown in FIGS. 1 and 2, the centroid C of the arcuate surface 56 is positioned centrally of the sideframe 40 in both the transverse and longitudinal directions. Ideally the centroid C is located not only in alignment with the longitudinal center axis of the transverse torsional member 49 but also vertically on the center axis. However, the centroid may be located slightly above the longitudinal center axis of the transverse torsional member in order to maximize the curvature of the arcuate bearing 57 without uneconomically increasing the size of the floating bearing 58. Loading by the carried member 7 thus is passed to the running gear of the vehicle without applying disproportionate loads on the axle bearings or to the structural members interengaging two such side frames as in a railcar truck. That is with the side bearings close to the side sills of the car body, bending moments in the body bolsters are reduced allowing the use of the side sills to carry almost the entire vertical load without the necessity to transmit those loads to the center sill.

Figure 5C:
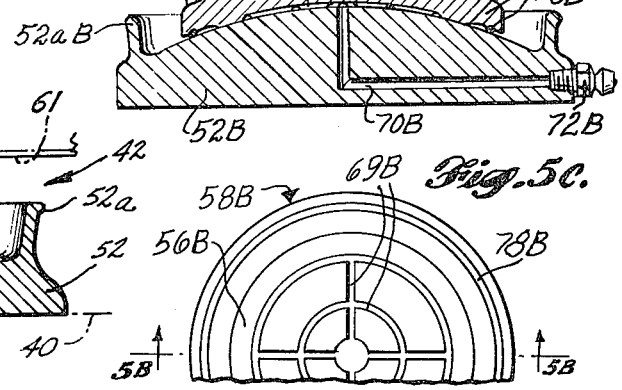
FIG. 5C is a bottom view of the floating central bearing member of the bearing of FIG. 5B.

FIG. 5A illustrates an alternative form of side bearing. In this embodiment a lower member or casting 52A is provided with an upwardly facing concave seat 54A on which is positioned a circular bearing race 57A which holds a plurality of ball bearings 56A. A floating central member or round casting 58A rests on the bearings and is provided with an upper recess having the antifriction composite disc 60. The disc 60 supports a polished plate 61 on the car body bolster 7 as in the preferred embodiment. FIGS. 5B and 5C illustrate an additional and preferred form of the side bearing which is generally similar to the side bearing of FIGS. 1–5 (like parts are designated with like reference numerals and the suffix letter B) except that the lower concave surface of the floating central bearing member 58B is interrupted to form an annular land 56B, as shown (FIG. 5C). The under surface of land 56B is generally arcuate in cross sectional configuration and mates with the surface of the convex domed mid-section of the lower bearing member 52B. Preferably, these mating concave-convex surfaces are of the same generally hemispherical cross sectional outlines projected at substantially the same radii from a common centroid, such that the central bearing member can move omnidirectionally on the lower bearing member about the centroid of the lower bearing member domed midsection.

A grease passage 70B is formed in the body of the lower member 52B and terminates at its outer end in an external grease fitting 72B. The inner end of the grease passage 70B communicates with the cavity 74B which is formed between the underside of the central member 58B and the domed midsection of the lower member 52B. As most clearly shown in FIG. 5C, the under surface of the central bearing member includes grease grooves 69B which are arranged concentrically and radially about the center of the cavity 74B. These grooves serve to channel and evenly distribute grease which is injected into the upper center point of the cavity 74B through the grease passage 70B. Thus, it is possible, by introducing lubricant at the center point of cavity 74B and allowing it to flow downwardly by gravity between the convex-concave bearing surfaces of the lower and central bearing members, to achieve long lasting and uniform lubrication. The central member 58B includes a peripheral lip 76B, the under surface of which mounts an o-ring wiper seal 78B. This seal removes dirt and contaminants from the load bearing surface. To provide low friction movement of the central bearing member relative to the lower bearing member, the lower surface of land 56B, or the surface of the lower bearing member domed mid-section, or both such surfaces are smooth; however, it will be recognized that one or both of these surfaces may be coated or impregnated with, or support a composite of teflon or other well known low friction materials.

The modified side bearings of FIGS. 5A, 5B and 5C each provides the same omni-directional vertically incompressible side bearing support as in the first preferred side bearing embodiment of FIGS. 1–5 but because of its steel bearing support will be capable of carrying greater loads than that of the first preferred embodiment.

As is evident the ball bearing form of the side bearing has a concave lower member as opposed to a convex lower member on the preferred embodiment. Obviously, the lower member of the preferred embodiment can also be concave. Furthermore, other satisfactory alternate configurations will be apparent to one skilled in the art, such as making the plate 61 concave or convex etc., so long as the vertically incompressible omni-directional conditions are satisfied.

While the preferred embodiments of the invention has been illustrated and described, it should be understood that variations will be apparent to one skilled in the art without departing from the principles of the invention. For example, the principles are equally applicable to seimtrailer trucks for road use. Accordingly, the invention is not to be limited to the specific embodiments described.

The embodiments of the invention in which a particular property or privilege is claimed are defined as follows:

1. A bearing, comprising: lower bearing means adapted to be fixed to a load carrying member; upper bearing means adapted to be fixed to a carried member; central bearing means in continuous load bearing contact with said upper and lower bearing means such that vertical loads can be transmitted substantially incompressibly from the carried member to the carrying member; said central bearing means and one adjacent bearing means respectively including a first pair of interengaged surfaces providing omni-directional, arcuate, low friction sliding movement of said central bearing means about a centroid relative to the one adjacent bearing means; said central bearing means and the other adjacent bearing means respectively including a second pair of interengaged surfaces providing omni-directional, planar, low friction sliding movement of the other adjacent means relative to said central bearing means.

2. The combination of claim 1 said movable central bearing means including a flat low-friction upper surface, a concave low-friction lower surface, said upper bearing means including a flat low-friction surface in engagement with the upper surface of said central bearing means, said lower bearing means including a convex low-friction upper surface in engagement with the concave lower surface of said central bearing means, and releasable retainer means holding said central bearing means on said lower bearing means.

3. The combination of claim 2 said lower bearing means including a peripheral flange extending upwardly past said central bearing means, groove means in said flange and wherein said retainer means includes a clip positioned over said central bearing means and seated in said groove means.

4. The combination of claim 1, including a flexible dust cover surrounding the sliding surfaces of said bearing means and inter-connected to, and between said carried member and said load carrying member.

5. Combination of claim 1 over surface of said first pair of low-friction surfaces having a coefficient of friction of between 0.02 and 0.10.

6. The combination of claim 1 in which the load created by the carried member is always borne directly below the lower fixed bearing means.

7. The combination of claim 6, in which the centroid of said lower fixed bearing means and said central bearing means is located within said carrying member.

8. The combination of claim 1, further comprising ball bearings between said first pair of low friction surfaces.

9. The combination of claim 1 wherein said central bearing means includes a continuous lower surface of hemispherical cross sectional configuration, and wherein said lower bearing means includes a mating upper surface of hemispherical cross sectional configuration in low friction engagement with said lower surface, said upper and lower surfaces each being formed at substantially the same radius from the centroid, and further comprising means for maintaining said upper and lower surfaces in load bearing contact with each other.

10. The combination of claim 1 wherein said central bearing means includes a land having an arcuate lower surface, and wherein said lower bearing means includes a mating upper surface of hemispherical cross sectional configuration in low friction engagement with said lower surface, said upper and lower surfaces each being formed at substantially the same radius from the centroid, and further comprising means for maintaining said upper and lower surfaces in load bearing contact with each other.

11. In a mobile vehicle having a carried member and a wheeled carrying member. Three super imposed vertical load bearing members, the upper bearing member being fixed to the carried member, the lower bearing member being fixed to the wheeled carrying member, said upper and lower bearing members each including a surface, the central bearing member including two opposed surfaces of the upper and lower bearing members such that vertical loads are transmitted incompressibly between the carried and wheeled carrying members while simultaneously therewith providing omni-directional movement therebetween about a centroid, and means interfacing between at least one pair of mating surfaces for producing a continuous frictional damping force proportional to the magnitude of a carried load in response to interface motion between the one pair of mating surfaces produced by relative movement of the carried and wheeled carrying members.

12. The invention defined by claim 8 wherein said interfacing means includes ball bearing means.

13. The invention defined by claim 11 wherein one of said members includes a continuous surface of hemispherical cross sectional configuration, and wherein one of the other of said members includes a mating surface of substantially identical hemispherical cross sectional configuration in low friction engagement with said continuous surface.

14. The invention defined by claim 11 wherein one of said members includes a land having an arcuate surface, and wherein one of the other of said members includes a mating surface of substantially identical hemispherical cross sectional configuration in low friction engagement with said arcuate surface.

15. A bearing, comprising: three superimposed bearing members, the lower of which is adapted to be fixed to a load carrying member, the upper of which is adapted to be fixed to a carried member, and the intermediate of which is in continuous load bearing contact with said upper and lower bearing members such that vertical loads can be transmitted substantially incompressibly from the carried member to the carrying member, said intermediate bearing member including a land having an arcuate lower surface, said lower bearing member having a surface slidably engaged with said lower surface such that said intermediate bearing member can move omni-directionally and arcuately about a centroid with low friction relative to said lower bearing member, said intermediate bearing member further including a flat upper surface, said upper bearing member having a surface slidably engaged with said upper surface such that said upper bearing member can move omni-directionally in a plane with low friction relative to said intermediate bearing member.

16. The bearing of claim 15, wherein said lower surface and said lower bearing member surface are of hemispherical cross sectional configurations, each formed at substantially the same radius from the centroid, and further comprising means for maintaining said land lower surface and said lower bearing member surface in load bearing contact with each other.

17. The bearing of claim 16, wherein said lower bearing member surface is convex and said lower surface is concave.

* * * * *

UNITED STATES PATENT OFFICE
CERTIFICATE OF CORRECTION

Patent No. 3,912,343　　　　　　　　Dated October 14, 1975

Inventor(s) Hamilton Neil King Paton, et al

It is certified that error appears in the above-identified patent and that said Letters Patent are hereby corrected as shown below:

Column 1, line 22, change "while" to --While--

Column 5, line 59, change "Combination of claim 1 over" to --The combination of claim 1 one --

Column 6, line 26, change "member. Three super imposed" to --member, three super imposed --;
　　　line 32, insert --which respectively mate with the surfaces-- after "surfaces";
　　　line 44, change "8" to --11--.

Signed and Sealed this twenty-fourth Day of February 1976

[SEAL]

Attest:

RUTH C. MASON  
*Attesting Officer*

C. MARSHALL DANN  
*Commissioner of Patents and Trademarks*